(12) United States Patent
Venable

(10) Patent No.: US 7,479,225 B1
(45) Date of Patent: Jan. 20, 2009

(54) WASTE MATERIAL CONTAINMENT APPARATUS AND DISPOSAL PROCESS

(76) Inventor: Timothy Venable, P.O. Box 392, Church Point, LA (US) 70525

( * ) Notice: Subject to any disclaimer, the term of this patent is extended or adjusted under 35 U.S.C. 154(b) by 597 days.

(21) Appl. No.: 11/204,936

(22) Filed: Aug. 15, 2005

(51) Int. Cl.
   *B01D 29/27* (2006.01)
(52) U.S. Cl. .................... 210/250; 210/317; 210/335; 210/474
(58) Field of Classification Search ........... 210/250, 210/312, 317, 335, 474, 475, 485, 499; 248/95, 248/97–101; 141/10, 114
   See application file for complete search history.

(56) References Cited

U.S. PATENT DOCUMENTS

| | | | | |
|---|---|---|---|---|
| 862,960 | A * | 8/1907 | Beyea | 426/407 |
| 1,065,821 | A * | 6/1913 | Mandel et al. | 210/335 |
| 1,168,532 | A * | 1/1916 | Meltz | 210/250 |
| 1,211,947 | A * | 1/1917 | Kiefer | 210/250 |
| 1,233,832 | A * | 7/1917 | Barbour | 220/9.3 |
| 1,895,904 | A * | 1/1933 | Lutts et al. | 220/9.4 |
| 1,946,884 | A * | 2/1934 | Rutherford | 312/351 |
| 3,091,339 | A * | 5/1963 | Marra et al. | 210/232 |
| 3,409,138 | A * | 11/1968 | Lawrence | 210/238 |
| 3,806,146 | A * | 4/1974 | Shaw | 280/7.12 |
| 4,052,163 | A * | 10/1977 | Patzner | 422/101 |
| 4,723,743 | A * | 2/1988 | Jenkins | 248/97 |
| 5,741,065 | A | 4/1998 | Bell et al. | |
| 6,461,098 | B1 | 10/2002 | Elefsrud | |
| 6,977,037 | B2 * | 12/2005 | Mioc | 210/167.01 |
| 2001/0002690 | A1 * | 6/2001 | Rosky | 248/99 |
| 2003/0070980 | A1 * | 4/2003 | Ray | 210/489 |
| 2004/0105741 | A1 * | 6/2004 | Inglese | 414/404 |
| 2007/0284312 | A1 * | 12/2007 | Lough | 210/724 |

* cited by examiner

*Primary Examiner*—David L Sorkin
(74) *Attorney, Agent, or Firm*—Robert N. Montgomery

(57) ABSTRACT

A waste cement collection apparatus utilizing a porous disposable bulk bag for collecting waste cement removed as a result of wash-out of the discharge chute of a cement mixer truck after a cement delivery, the apparatus further having a method for filtering, collecting, and holding cement contaminated waste fluids for recovery and disposal. A service process is also described for the provision and recovery of the collection apparatus and the transport and disposition of the waste materials.

13 Claims, 7 Drawing Sheets

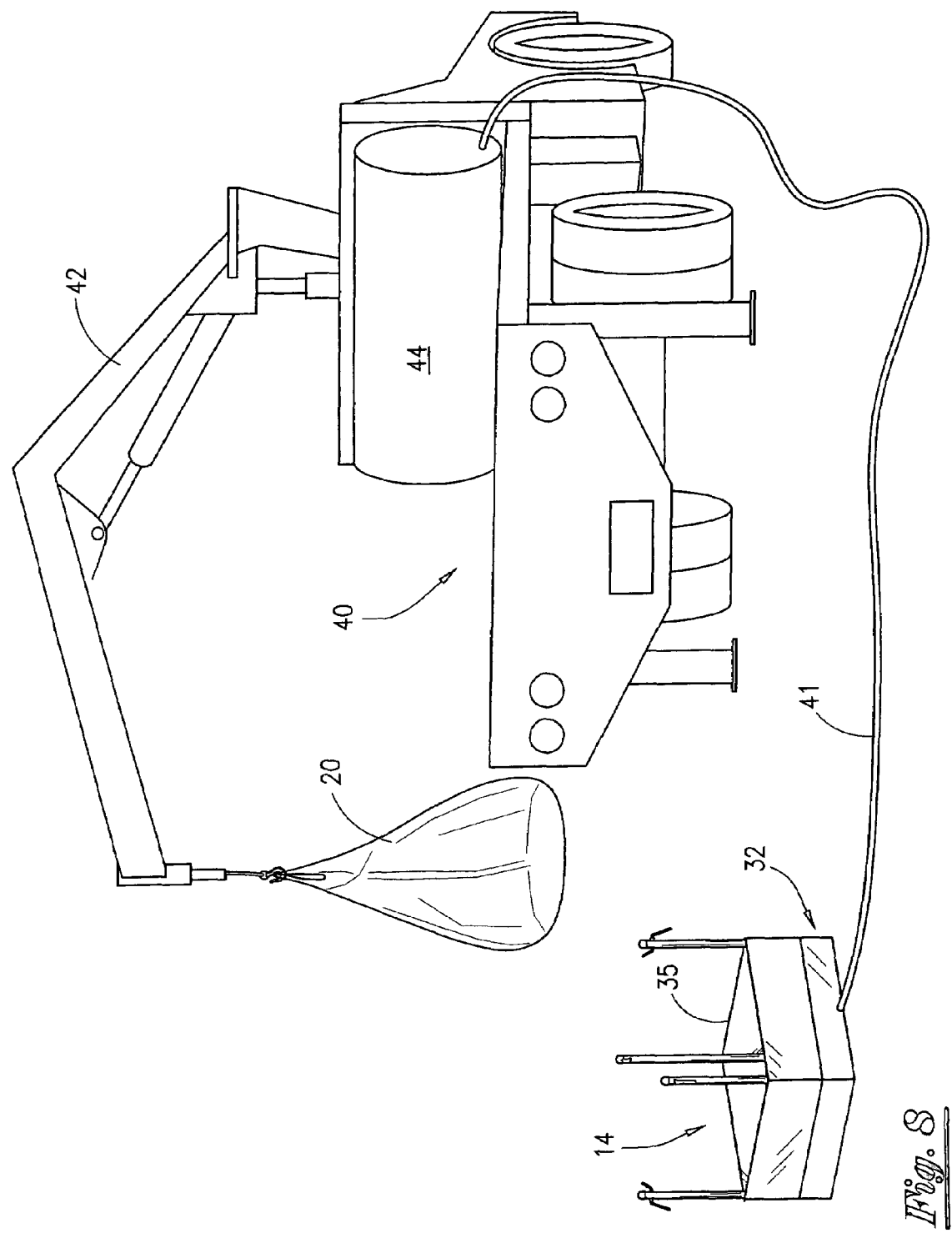

WASTE MATERIAL CONTAINMENT APPARATUS AND DISPOSAL PROCESS

1. FIELD OF THE INVENTION

This invention relates generally to the containment and disposal of cement waste and more particularly to the collection and disposal of cement waste resulting from the wash out of a cement truck's discharge chute at a job site after cement has been discharged from the truck and the process of collection, removal and disposal of the waste material.

2. GENERAL BACKGROUND

It is well known within the art that concrete or cement transport trucks with rotating drums for continuous mixing of the concrete or cement during transport, are used to deliver ready mix concrete or cement to a construction site. Upon delivery and discharge of the specified quantity of concrete or cement on the job site, it is the general practice for the truck driver to remove, by washing and scrubbing, any residual cement or concrete material remaining within or on the truck's discharge chute. If allowed to dry the excess material would bond to the chute and build up to a point that would make the chute unusable. The trucks generally carry sufficient water for this purpose. It has also been the general practice in many states to simply allow the waste cement or concrete and the wash water to be deposited on the ground at the job site. In some cases the wash water is allowed to run off topically to drainage ditches and the excess waste cement or concrete is then scooped up from the ground and deposited in dumpsters for transport to a land fill by the construction crews. Such practices ignore the water contamination problem, while using valuable space in the dumpster and adding to the cost of deposition in sanitary landfills. However, environmental laws are now requiring that such deposits be contained and removed from the job site in some manner.

Various methods have been disclosed for solving this problem, such as providing a catch container carried by the cement truck for collecting the water cement and wash water and a method of lifting such drums and their contents for deposition back into the transport truck's mixing drum. Such methods have one common problem: they must also be thoroughly cleaned as well. The considerable cost and the transport, storage, positioning, handling, and washing of such catch containers consumes a considerable amount of money, time and energy that could be better used elsewhere.

3. SUMMARY OF THE INVENTION

A more cost efficient method and apparatus for collecting and disposing of waste concrete and cement resulting from a cement transport truck's wash down procedure is disclosed herein. The method involves the use of a disposable bulk bag, a containment frame for supporting the bag and a reservoir for collecting and storing the wash water. The process method entails the collection of the disposable bags and wash water for transport by a service provider and disposal at a cement plant for reuse or deposition in a non-sanitary land fill where the dumping charges are much lower.

It is therefore an object of the invention to provide a containment, having removable disposable bulk bags, for location on job sites suitable for deposition of wash water and cement or concrete waste material commonly removed from cement trucks and collected from other cement operations usually found at construction sites.

It is a further object of the invention to provide a service method for collecting the above mentioned bulk bags and wash water from each job site on a routine basis for transport and disposal.

4. BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 8 is an isometric illustrative view of the collection and transport process used for the delivery, recovery, collection, and transport of the cement waste containment bags and contaminated fluids.

5. DETAILED DESCRIPTION OF THE PREFERRED EMBODIMENT

Figure 1:
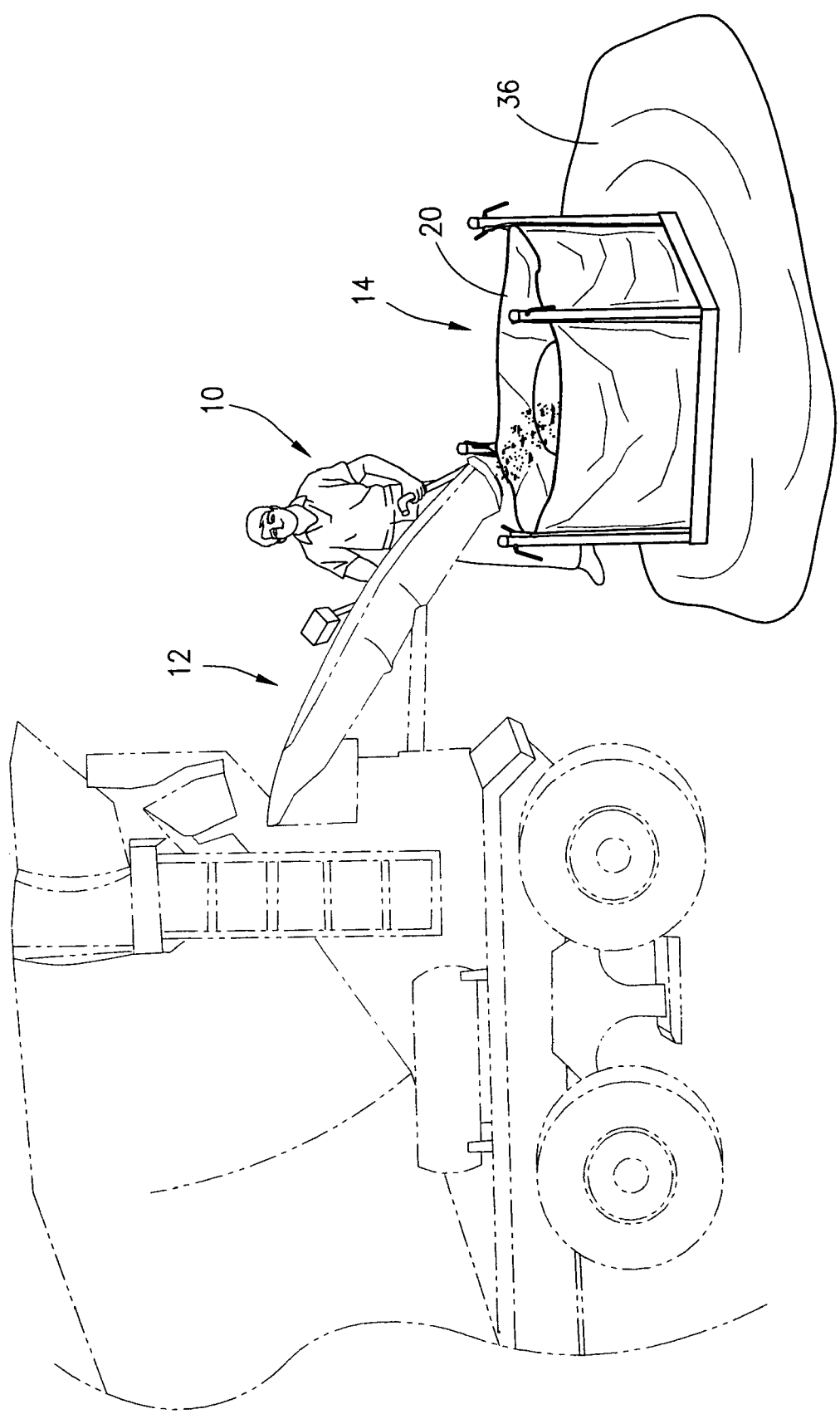
FIG. 1 is an isometric illustrative view of a transport cement truck depositing waste material and fluids into a bulk container and allowing the fluids to permeate through the bag.

As illustrated in FIG. 1, after making a cement delivery the cement mix transport truck driver 10 usually uses a special rake and a brush with water to wash out the delivery chute 12. Such washing and cleaning may also include other job site cement equipment and tools. As now required, some method must be used to collect the waste materials. In this case a waste cement collection apparatus 14 including a disposable, permeable bulk bag is provided to collect the waste cement in a manner whereby the water is filtered by permeation and passes though the containment bulk bag 20 and allowed to run off into a fluid holding or drainage area or simply allowed to evaporate.

Figure 2:
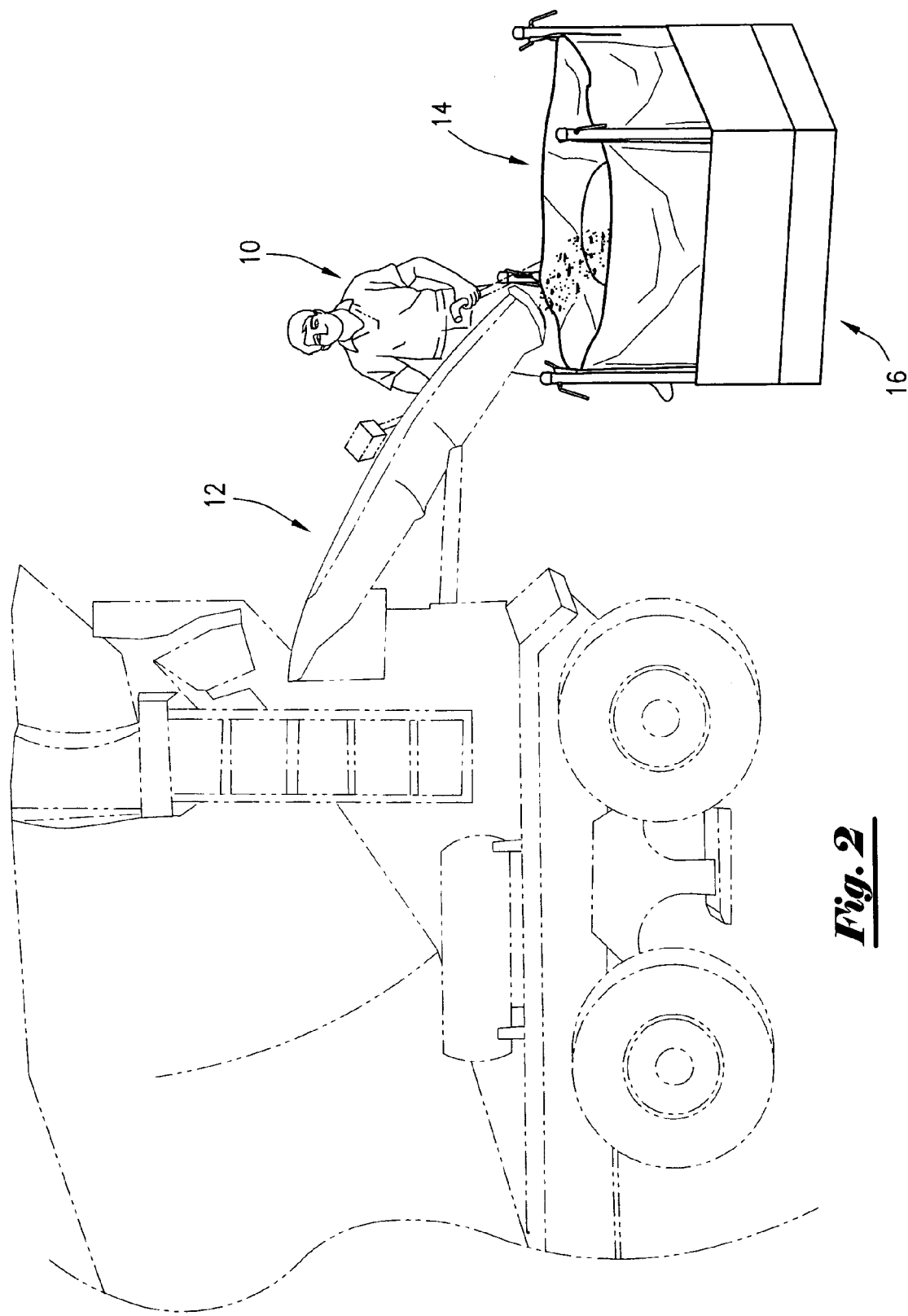
FIG. 2 is an isometric illustrative view of a transport cement truck depositing waste material and fluids into a bulk container and allowing the fluids to permeate through the bag and collected in lower fluid collection tank.

In some cases, where no drainage area is provided, a basin or fluid holding tank 16 may be provided, as seen in FIG. 2, in which case the waste cement apparatus 14 is fitted with and supported by a fluid catch basin or holding tank 16.

Figure 3:
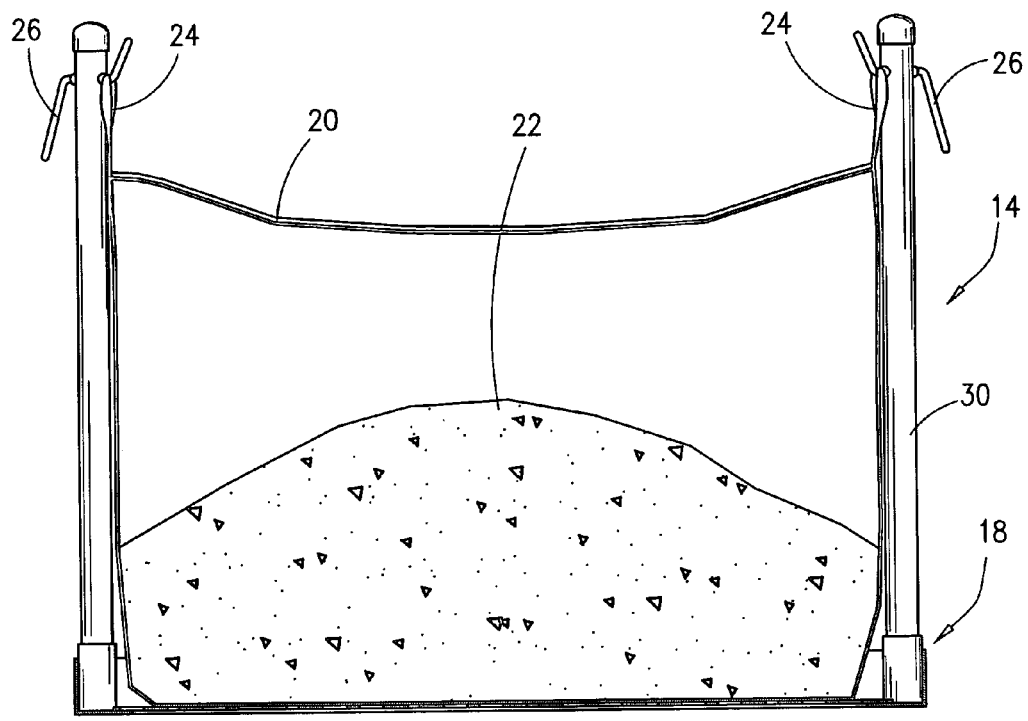
FIG. 3 is cross-section view of the bulk container and its support frame showing cement deposit within the containment bag.
Figure 4:
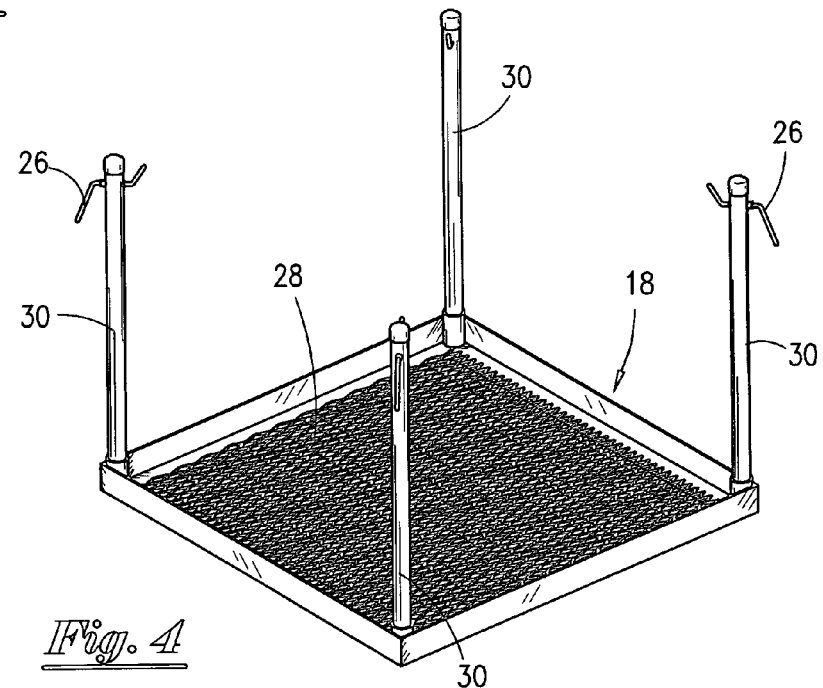
FIG. 4 is an isometric view of the containment support frame.

Looking now at FIG. 3, we see that the waste cement collection apparatus 14 is composed of a frame assembly 18 for supporting a bulk bag 20 containing the waste cement 22. The bulk bags generally have lifting loops 24 at four corners attached and held in an open position by rotating handles 26 used to facilitate removal of the loops 24. The frame assembly 18, as shown in FIG. 4, further includes a porous metal floor 28 and removable post 30 which include the rotating handles 26.

Figure 5:
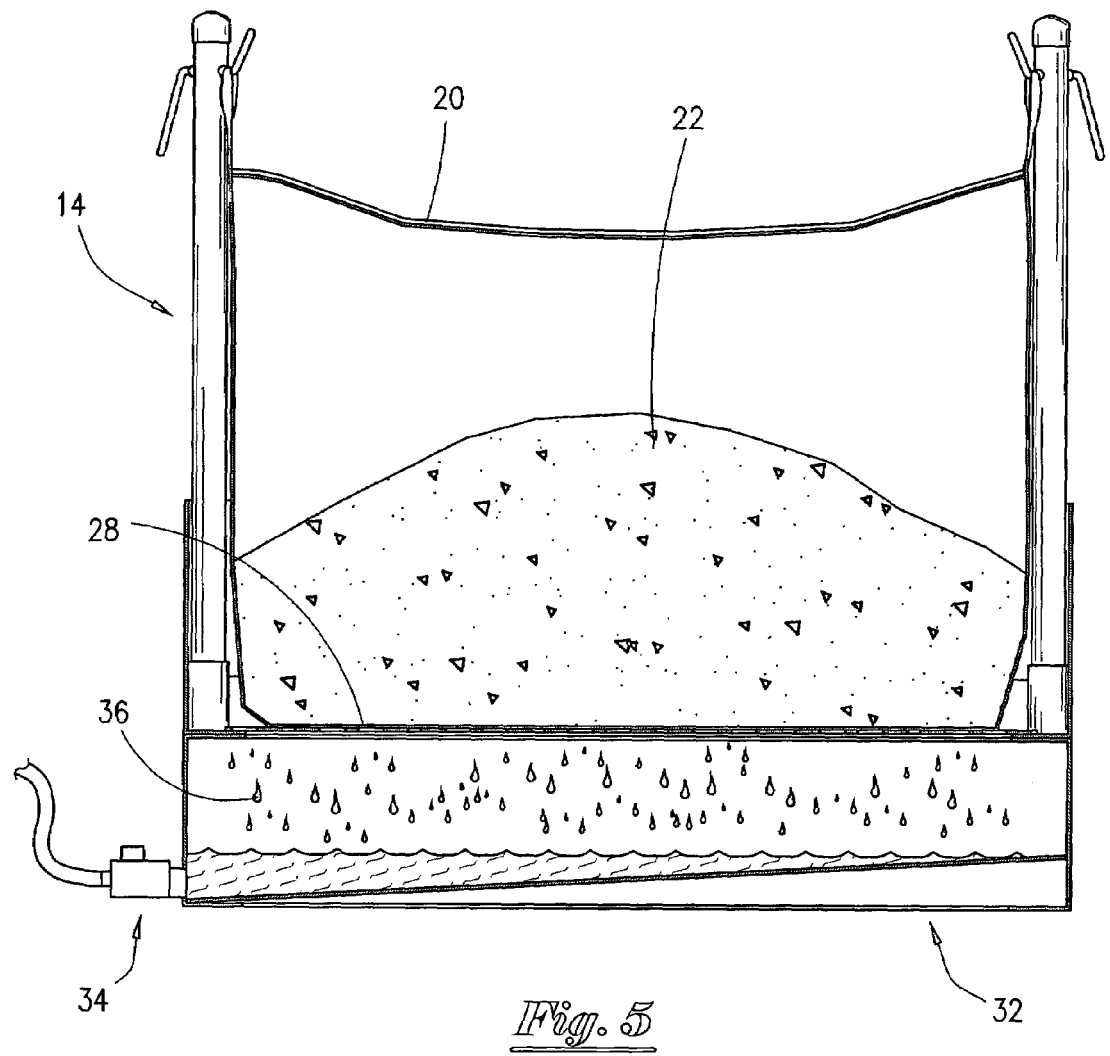
FIG. 5 is a cross-section view of a second embodiment having a fluid collection tank supporting the containment support frame.
Figure 6:
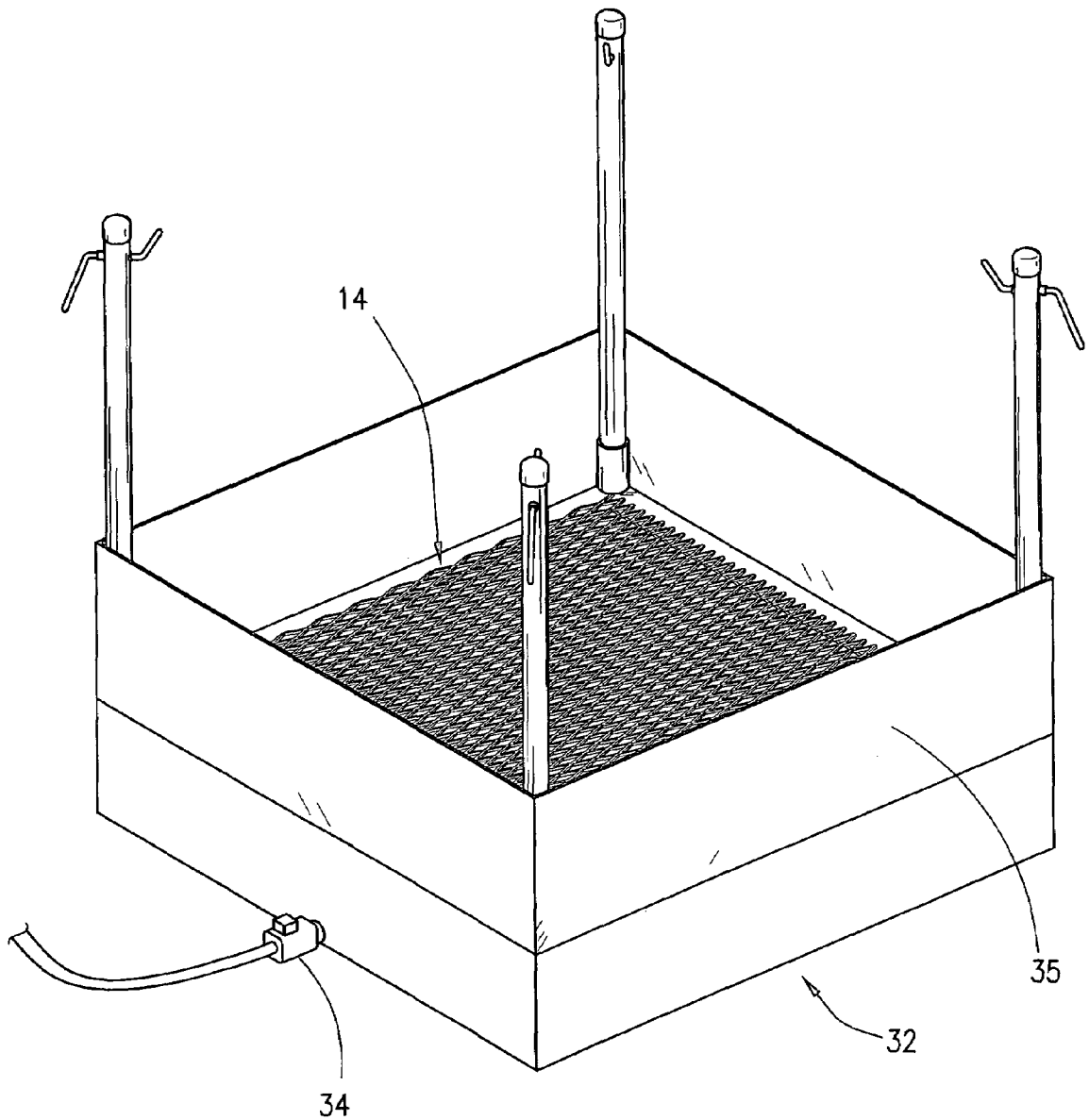
FIG. 6 is an isometric view of the combination containment support frame and fluid collection tank.

As shown in FIG. 5, a fluid collection basin or holding tank assembly 32 may be fitted to the cement waste collection apparatus 14, thereby allowing the fluids mixed with the cement waste 22 to form a slurry that permeates through the bulk bag 20 and the porous floor 28 and collects within the basin or holding tank 32. A hose connection and/or a valve assembly 34 are provided for attachment of a suction hose used to retrieve the fluids from the tank for disposal. A skirting 35 may also be applied to the holding tank assembly 32, as shown in FIG. 6, to further support the bulk bag 20 and insure recovery of the waste fluids 36 seen in FIG. 5. It should be noted that the basin or holding tank assembly 32 serves as a support for the cement waste collection apparatus 14 and may be made and provided as a separate assembly. The skirting 35 extends above the basin 32, surrounding the base assembly 18 and extending at least midway up the post 30 serves to further contain fluids seeping through the sides of the bag 20.

Figure 7:
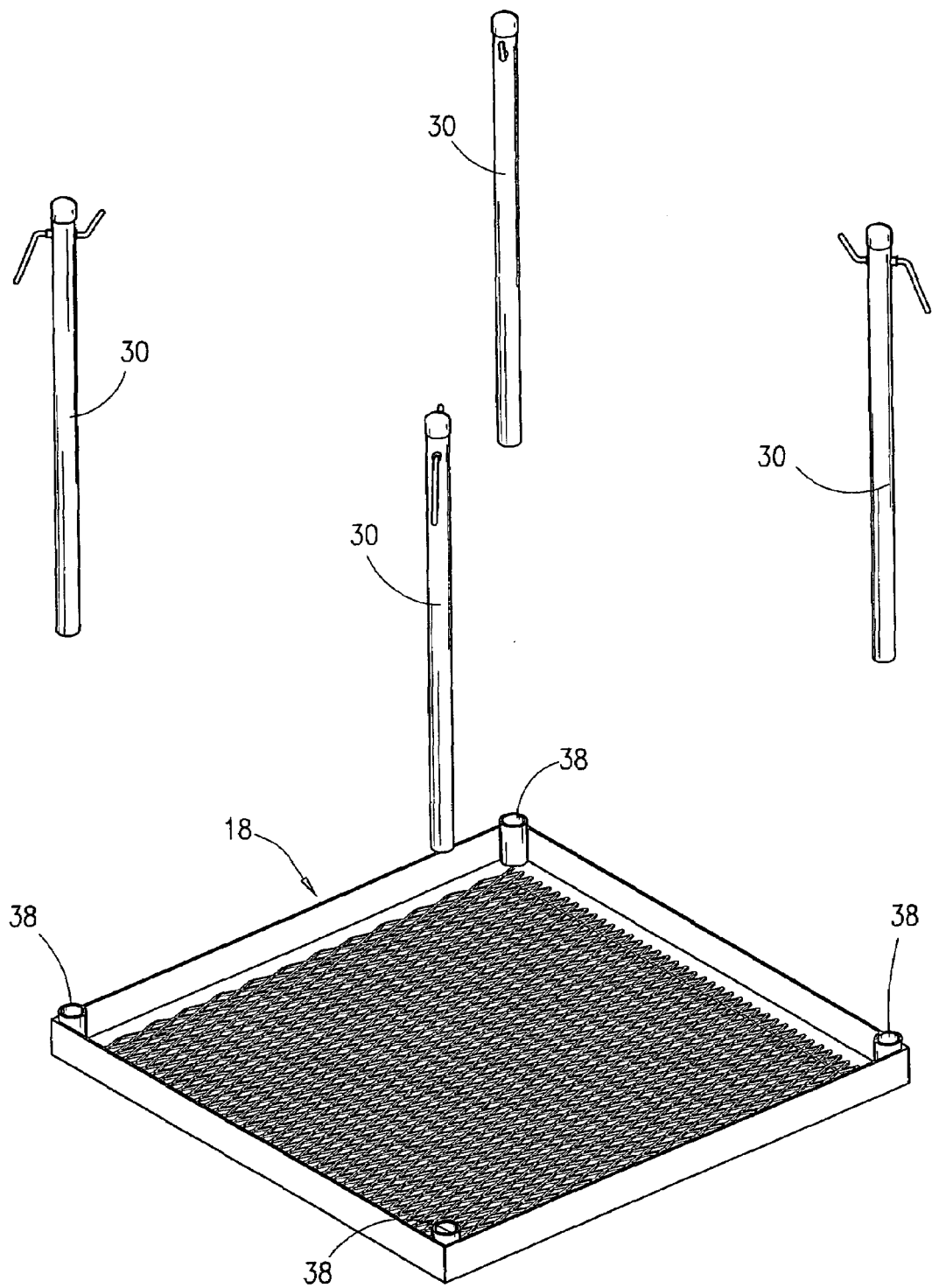
FIG. 7 is an exploded view of the containment support frame assembly.

The support post 30 may be removed and reinserted in sockets 38, as shown in FIG. 7, to facilitate stacking of the frame assemblies 18 during transport and to facilitate the removal of the bulk bags if necessary.

Looking now at FIG. 8, it may be seen that some method must be employed for recovery and transport of the bulk bags 20 and the contaminated waste fluids 36 via a hose 41 and pump-out tank 44. This may be accomplished with a transport vehicle 40 having a crane 42, as illustrated, or by using an on-site fork lift to lift the bags 20 on to a transport vehicle.

By providing the construction contractor with a service whereby collection container assemblies and disposable bags are provided to the construction site and further providing recovery of the assemblies once the cement work project have been completed, as well as the removal of waste materials in the form of waste cement and its contaminated waste water for disposal in land fills or recycling at cement plants, the contractor is relieved of a tremendous burden.

Such a collection and disposal service saves the cement hauler time and money and insures that proper collection and disposal codes are followed. The contractor saves money by removing waste cement from the refuse dumpsters and is further relieved of the burden of possible environmental contamination complaints.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A waste cement containment system comprising:
   a) a bulk bag support assembly comprising a porous rigid support member having an upper and a lower face and a plurality of removable posts attached perpendicular to said upper face;
   b) an open top fluid catch basin having a bottom portion, vertical walls, an interior panel sloping to one side defining a deep and shallow end and a pump connecting means for extracting fluid from said basin attached to said lower face;
   c) a permeable bulk bag capable of containing waste cement having lifting means said bulk bag supported by said support member; and
   d) an attachment means located adjacent a free end of each said post for temporarily attaching and quick releasing said permeable bulk bag held in an open configuration.

2. The waste cement containment assembly according to claim 1 wherein said fluid catch basin further comprises a skirting surrounding said plurality of post adjacent said fluid catch basin.

3. The waste cement containment assembly according to claim 1 wherein said attachment means is a crank arm passing through a hole in each said post.

4. The waste cement containment assembly according to claim 1 wherein said lifting means is a plurality of straps attached to and supportive of said cement containment bag having loops at each end.

5. A cement waste cement containment system for the collection of concrete debris from a construction site namely the separation of fluids from excess cement and the disposal thereof comprising:
   a) a bulk bag support assembly comprising a fluid container having a bottom portion and vertical walls, an interior panel sloping to one side defining a deep and shallow end of said container and a pipe nipple extending from a said vertical wall adjacent said deep end;
   b) a rigid porous floor member having an upper and lower face supported by said fluid container located within said vertical walls in a standoff relationship with said interior panel;
   c) a plurality of vertical posts removably attached to said upper face extending above said vertical walls;
   d) a bag support and release attachment located adjacent an end of each said post; and
   e) a waste cement containment bag having flexible lifting means the bag temporarily attached to and supported by each said bag support and release attachment, said floor member and at least partially contained within said vertical walls.

6. The cement waste containment assembly according to claim 5 wherein said waste containment bag when containing wet cement and wash fluids is sufficiently permeable to allow only said fluids to pass through said bag.

7. The cement waste containment assembly according to claim 6 wherein said fluids passing through said bag also pass through said porous floor member and into said fluid container.

8. The cement waste containment assembly according to claim 5 wherein said bag support and release attachment is a crank arm passing through a hole in each said post.

9. The cement waste containment assembly according to claim 5 wherein said lifting means is a plurality of straps attached to and supportive of said cement containment bag having loops at each end.

10. The cement waste containment assembly according to claim 5 further comprising:
    a) a transport vehicle having a flat deck;
    b) a loader having an articulating boom attached to said transport vehicle said loader having a lifting hook; and
    c) a fluid pump system connected fluidly to a fluid receiving tank having external connecting hose secured to said transport vehicle.

11. The cement waste containment system according to claim 10 wherein said lifting hook is temporally attached to said flexible lifting means and said bulk bag is extracted from said bulk bag support assembly by said loader and placed on said flat deck.

12. The cement waste containment system according to claim 10 wherein said connecting tank hose is temporally connected to said pipe nipple.

13. The cement waste containment system according to claim 12 wherein said fluid pump system extracts fluids from said fluid container and deposits them into said receiving tank for transport.

* * * * *